(12) United States Patent
Tschirschke

(10) Patent No.: US 10,119,457 B2
(45) Date of Patent: Nov. 6, 2018

(54) EXHAUST-GAS TURBOCHARGER

(71) Applicant: BorgWarner Inc., Auburn Hills, MI (US)

(72) Inventor: Juergen Tschirschke, Hettenleidelheim (DE)

(73) Assignee: BorgWarner Inc., Auburn Hills, MI (US)

(*) Notice: Subject to any disclaimer, the term of this patent is extended or adjusted under 35 U.S.C. 154(b) by 662 days.

(21) Appl. No.: 14/406,313

(22) PCT Filed: Jun. 14, 2013

(86) PCT No.: PCT/US2013/045775
§ 371 (c)(1),
(2) Date: Dec. 8, 2014

(87) PCT Pub. No.: WO2013/192027
PCT Pub. Date: Dec. 27, 2013

(65) Prior Publication Data
US 2015/0192062 A1     Jul. 9, 2015

(30) Foreign Application Priority Data

Jun. 21, 2012   (DE) ........................ 10 2012 012 495

(51) Int. Cl.
| F02B 37/18 | (2006.01) |
|---|---|
| F01D 17/10 | (2006.01) |
| F01D 11/00 | (2006.01) |

(52) U.S. Cl.
CPC .......... *F02B 37/183* (2013.01); *F01D 11/005* (2013.01); *F01D 17/105* (2013.01);
(Continued)

(58) Field of Classification Search
CPC .... F01D 11/005; F01D 17/105; F02B 37/183; F05D 2220/40; F05D 2260/231
See application file for complete search history.

(56) References Cited

U.S. PATENT DOCUMENTS

| 3,044,683 | A | * | 7/1962 | Woollenweber, Jr. ....................... F02B 37/16 415/143 |
|---|---|---|---|---|
| 3,233,403 | A | * | 2/1966 | MacInnes ............. F02B 37/183 60/600 |

(Continued)

FOREIGN PATENT DOCUMENTS

| DE | 102010036778 A1 * | 5/2011 | ............ F02B 37/183 |
|---|---|---|---|
| KR | 20110049153 A | 5/2011 | |

OTHER PUBLICATIONS

International Search Report and Written Opinion in International Application No. PCT/US2013/045775 dated Dec. 13, 2013.

*Primary Examiner* — Phutthiwat Wongwian
*Assistant Examiner* — Matthew T Largi
(74) *Attorney, Agent, or Firm* — Eric L. Doyle; Stephan A. Pendorf; Patent Central LLC

(57) ABSTRACT

An exhaust-gas turbocharger (1) with a turbine housing (2) which has a turbine housing inlet (8) and a turbine housing outlet (9), and which has a wastegate duct (10) between the turbine housing inlet (8) and the turbine housing outlet (9), and a shut-off element (13) for opening and closing the wastegate duct (10). The shut-off element (13) comprises a sleeve (14), which is inserted into the turbine housing (2), and a piston (22), which is guided in the sleeve (14) so as to be movable along a longitudinal axis (L). The sleeve (14) has apertures (15, 16) at which the wastegate duct (5) opens out into the interior of the sleeve (14).

6 Claims, 2 Drawing Sheets

(52) U.S. Cl.
CPC .... *F05D 2220/40* (2013.01); *F05D 2260/231* (2013.01); *Y02T 10/144* (2013.01)

(56) References Cited

U.S. PATENT DOCUMENTS

| | | | | |
|---|---|---|---|---|
| 4,304,097 | A * | 12/1981 | Kondo | F02B 37/186 60/602 |
| 4,499,731 | A * | 2/1985 | Moser | F01D 17/105 415/157 |
| 4,515,344 | A * | 5/1985 | Gemignani | F16K 41/10 251/214 |
| 4,655,040 | A * | 4/1987 | Parker | F02B 37/183 251/25 |
| 4,802,817 | A * | 2/1989 | Tyler | F01D 17/143 415/157 |
| 5,673,559 | A * | 10/1997 | Benson | F01D 9/026 415/144 |
| 5,855,117 | A * | 1/1999 | Sumser | F01D 17/143 415/158 |
| 8,291,703 | B2 * | 10/2012 | Garrett | F01D 17/167 415/158 |
| 9,599,243 | B1 * | 3/2017 | Taylor | F16K 17/14 |
| 9,638,097 | B2 * | 5/2017 | Boehmer | F02B 37/16 |
| 2002/0078934 | A1 | 6/2002 | Hohkita et al. | |
| 2008/0245228 | A1 * | 10/2008 | Lombard | F01D 17/08 92/181 R |
| 2010/0263371 | A1 * | 10/2010 | Chen | F01D 17/105 60/602 |

\* cited by examiner

EXHAUST-GAS TURBOCHARGER

BACKGROUND OF THE INVENTION

Field of the Invention

The invention relates to an exhaust-gas turbocharger according to the preamble of claim 1.

Description of the Related Art

For charge pressure regulation, the generic exhaust-gas turbocharger is provided with a wastegate duct which connects the turbine inlet to the turbine outlet while bypassing the turbine wheel. When the required charge pressure is attained, at least a part of the exhaust-gas flow can be conducted past the turbine or past the turbine wheel through said wastegate or bypass duct. To open and close said wastegate duct, there is provided a wastegate flap which is also referred to as a charge pressure regulating flap. Said charge pressure regulating flap is connected via a linkage to an actuator which may for example be in the form of a pneumatic or electric control capsule.

The disadvantage of such a charge pressure regulating flap arrangement is the large number of individual parts that must be manufactured and assembled.

It is therefore an object of the present invention to provide an exhaust-gas turbocharger which is of simpler construction and is easier to assemble.

BRIEF SUMMARY OF THE INVENTION

According to the invention, a linearly movable piston is used for opening and closing the wastegate duct. According to the invention, to thermally decouple the guide of the piston from the turbine housing, a sleeve is provided. In particular, there is formed between the sleeve and the turbine housing a gap which is large enough to ensure that the sleeve remains unaltered even in the event of thermal expansion of the turbine housing.

The wastegate duct branches off from the turbine housing inlet upstream of the impingement of flow on the turbine wheel, and leads to the turbine housing outlet while bypassing the turbine wheel. According to the invention, the sleeve with the piston guided therein is arranged in said wastegate duct. The wastegate duct extending from the turbine housing inlet opens out via a first aperture in the sleeve. The wastegate duct continues onward to the turbine housing outlet via a second aperture. The wastegate duct is thus closed or open depending on the position of the piston within the sleeve.

It is preferably provided that the first aperture is arranged parallel to the longitudinal axis of the sleeve, or on the end side of the piston. The second aperture via which the exhaust gas exits the interior of the sleeve is arranged perpendicular to the longitudinal axis, or on the lateral surface of the piston. For improved friction between the piston and sleeve, piston rings are provided on the lateral surface of the piston.

For the movement or positioning of the piston, the piston is connected to an actuator via a piston rod. Said actuator is preferably a pneumatically, electrically or hydraulically actuable control element. The piston rod is preferably guided through a cover which closes off the sleeve. The piston may be connected to the piston rod either rigidly or via a joint in order to ensure a linear movement along the longitudinal axis. If required, the piston rod may be sealed off with respect to the cover.

The thermal de-coupling between the turbine housing and sleeve, in particular by the gap, leads to reduced wear of the sliding surface between the piston and sleeve and to reduced thermal distortion, whereby the sealing action of the shut-off element in the wastegate duct is maintained.

BRIEF DESCRIPTION OF THE SEVERAL VIEWS OF THE DRAWINGS

Further details, advantages and features of the present invention become apparent from the following description of an exemplary embodiment with reference to the drawing, in which.

DETAILED DESCRIPTION OF THE INVENTION

The exemplary embodiment of the exhaust-gas turbocharger 1 will be explained in detail below on the basis of FIGS. 1 and 2.

Figure 1:
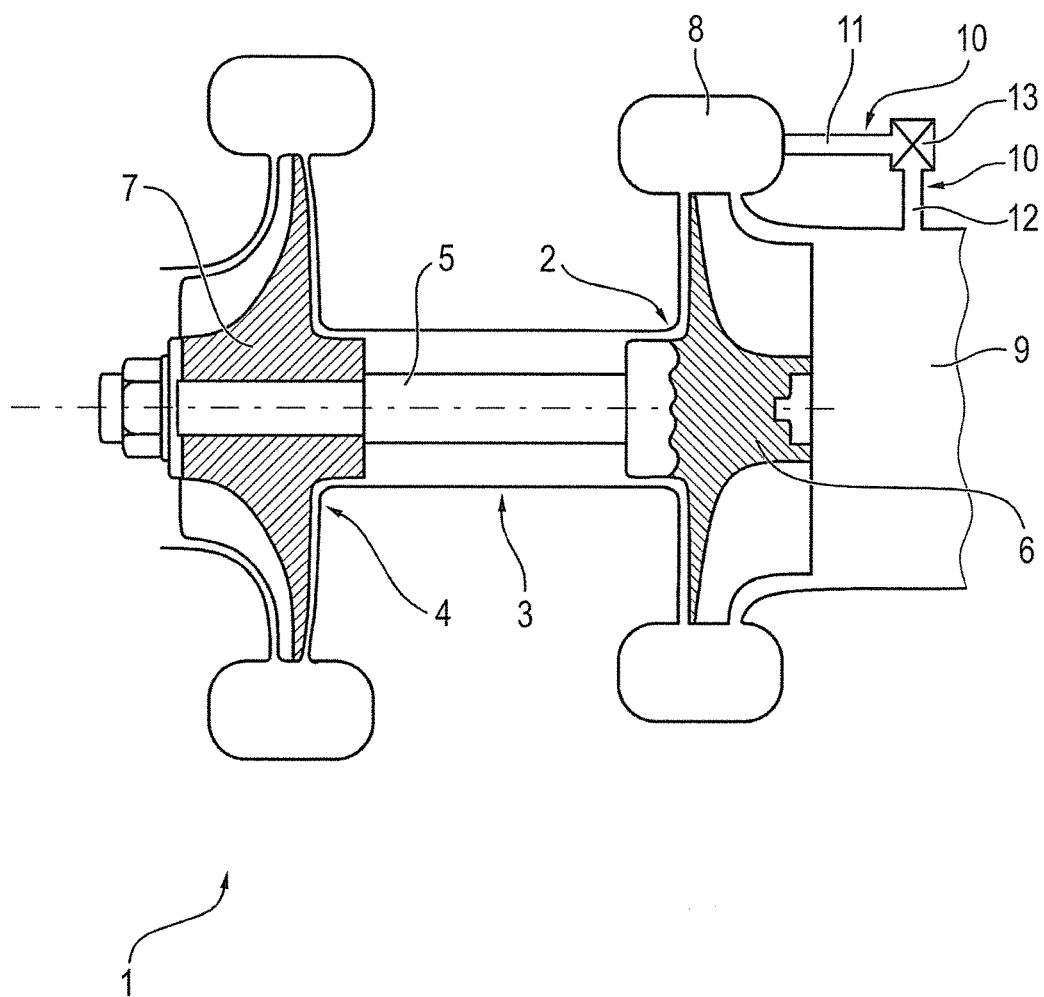
FIG. 1 shows a schematically simplified view of an exhaust-gas turbocharger according to the invention as per an exemplary embodiment.

FIG. 1 shows the exhaust-gas turbocharger 1 in a schematically simplified view. Said exhaust-gas turbocharger comprises a turbine housing 2, a bearing housing 3 and a compressor housing 4. A shaft 5 is rotatably mounted in the bearing housing 3. A turbine wheel 6 is seated, on one end of the shaft 5, in the turbine housing 2. A compressor wheel 7 is seated, on the other side of the shaft 5, in the compressor housing 4.

A turbine housing inlet 8 and a turbine housing outlet 9 are formed in the turbine housing. During operation of the exhaust-gas turbocharger 1, exhaust gas flows to the turbine wheel 6 via the turbine housing inlet 8. After the exhaust gas flows to the turbine wheel 6, it exits the exhaust-gas turbocharger 1 via the turbine housing outlet 9. By means of the rotating turbine wheel 6 and the shaft 5, the compressor wheel 7 is set in rotation and thus compresses charge air for an internal combustion engine.

A wastegate duct 10 leads from the turbine housing inlet 8 to the turbine housing outlet 9 while bypassing the turbine wheel 6. A shut-off element 13 for opening and closing the wastegate duct 10 is formed in the wastegate duct 10. A first portion 11 of the wastegate duct 10 leads from the turbine housing inlet 8 to the shut-off element 13. A second portion 12 of the wastegate duct 10 leads from the shut-off element 13 to the turbine housing outlet 9.

Figure 2:
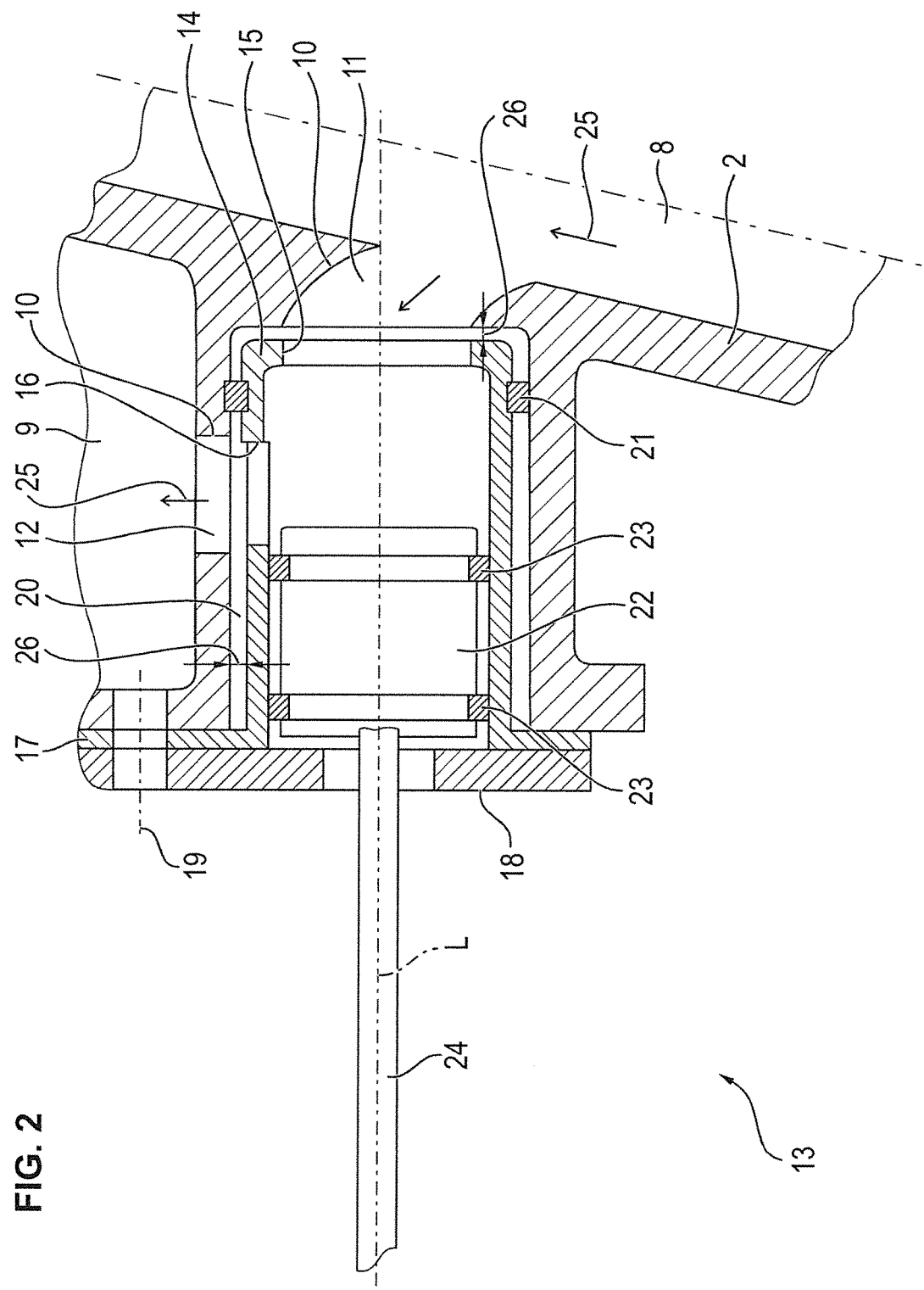
FIG. 2 shows a detail of the exhaust-gas turbocharger according to the invention as per the exemplary embodiment.

FIG. 2 shows, in detail, the shut-off element 13 integrated into the turbine housing 2. Furthermore, FIG. 2 shows the turbine housing inlet 8 formed as a duct in the turbine housing 2. Said turbine housing inlet 8 leads to the turbine wheel 6. The first portion 11 of the wastegate duct 10 branches off from the turbine housing inlet 8. The first portion 11 leads to a sleeve 14 which is inserted into the turbine housing 2. Proceeding from said sleeve 14, the second portion 12 of the wastegate duct 10 leads to the turbine housing outlet 9.

The sleeve 14 has a first aperture 15 and a second aperture 16. The first portion 11 of the wastegate duct 10 opens out into the first aperture 15. The second aperture 16 is formed on the second portion 12 of the wastegate duct 10, such that via the second aperture 16 and the second portion 12, the indicated flow 25 of the exhaust gas can be conducted to the turbine housing outlet 9.

The sleeve 14 has a longitudinal axis L. The first aperture 15 conducts the exhaust gas into the interior of the sleeve 14 in a direction parallel to the longitudinal axis L. The exhaust gas exits the interior of the sleeve 14 transversely with respect to the longitudinal axis L via the second aperture 16.

A collar 17 is formed on the sleeve 14 perpendicularly to the longitudinal axis L. Said collar 17 bears against the turbine housing 2. A cover 18 is perpendicular to the longitudinal axis L and closes off the sleeve 14. The cover 18 and the collar 17 are connected to the turbine housing 2 by means of a screw connection 19.

A gap 20 is formed between the sleeve 14 and the turbine housing 2. A sealing ring 21 is seated in said gap 20, between the first aperture 15 and the second aperture 16. The gap 20 has a gap width 26. The gap 20 is formed over the entire length of the sleeve 14 and over the full circumference about the sleeve 14. The gap 20 between the sleeve 14 and the turbine housing 2 is likewise also provided at the end side of the sleeve 14, in particular at the side at which the first aperture 15 is formed.

A piston 22 is guided in the sleeve 14 so as to be longitudinally movable along the longitudinal axis L. The piston 22 is received in the sleeve 14 in a slidingly movable fashion via piston rings 23. The throughflow of the exhaust gas from the first aperture 15 to the second aperture 16 is enabled or shut off depending on the position of the piston.

The piston 22 is connected via a piston rod 24 to an actuator (not shown). The piston rod 24 extends through the cover 18.

The gap width 26 is selected to be large enough that the sleeve 14 is deformed as little as possible during the normally occurring thermal expansion of the turbine housing 2. It is thus ensured that the entire shut-off element 13 functions in a sealed manner with little wear.

In addition to the above written description of the invention, reference is hereby explicitly made to the diagrammatic illustration of the invention in FIGS. 1 and 2 for additional disclosure thereof.

LIST OF REFERENCE SIGNS

1 Exhaust-gas turbocharger
2 Turbine housing
3 Bearing housing
4 Compressor housing
5 Shaft
6 Turbine wheel
7 Compressor wheel
8 Turbine housing inlet
9 Turbine housing outlet
10 Wastegate duct
11 First portion
12 Second portion
13 Shut-off element
14 Sleeve
15 First aperture
16 Second aperture
17 Collar
18 Cover
19 Screw connection
20 Gap
21 Sealing ring
22 Piston
23 Piston rings
24 Piston rod
25 Flow
26 Gap width

The invention claimed is:

1. An exhaust-gas turbocharger (1) comprising:
a turbine housing (2)
which has a turbine housing inlet (8) and a turbine housing outlet (9), and
which has a wastegate duct (10) between the turbine housing inlet (8) and the turbine housing outlet (9), and
a shut-off element (13) for opening and closing the wastegate duct (10),
wherein
the shut-off element (13) comprises a sleeve (14), which is inserted into the turbine housing (2), and a piston (22), which is located in the sleeve (14) so as to be slidingly movable along a longitudinal axis (L) within the sleeve (14) via piston rings (23) between an open position and a closed position,
the sleeve (14) has a first aperture (15) in communication with the turbine housing inlet (8) and a second aperture (16) in communication with the turbine housing outlet (9), with a gap (20) between the sleeve (14) and turbine housing (2) dimensioned for thermal decoupling of the sleeve (14) and turbine housing (2), and with a sealing ring (21) arranged in the gap (20),
the piston when in the closed position closes the first aperture (15) and the second aperture (16) to block exhaust flow through the sleeve (14), and when in the open position opens the first aperture (15) and the second aperture (16) for exhaust flow through the sleeve (14), and
the wastegate duct (10) communicates with the sleeve (14) parallel to the longitudinal axis (L) at the first aperture (15) and transversely with respect to the longitudinal axis (L) at the second aperture (16).

2. The exhaust-gas turbocharger as claimed in claim 1, wherein the sleeve (14) bears with a collar (17) against the turbine housing (2).

3. The exhaust-gas turbocharger as claimed in claim 1, wherein the sleeve (14) is closed off by means of a cover (18).

4. The exhaust-gas turbocharger as claimed in claim 1, further comprising a piston rod (24) which connects the piston (22) to an actuator.

5. An exhaust-gas turbocharger (1) comprising:
a turbine housing (2)
which has a turbine housing inlet (8) and a turbine housing outlet (9), and
which has a wastegate duct (10) between the turbine housing inlet (8) and the turbine housing outlet (9), and
a shut-off element (13) for opening and closing the wastegate duct (10),
wherein
the shut-off element (13) comprises a sleeve (14), which is inserted into the turbine housing (2), and a piston (22), which is located in the sleeve (14) so as to be slidingly movable along a longitudinal axis (L) within the sleeve (14) via piston rings (23) between an open position and a closed position,
the sleeve (14) has a first aperture (15) in communication with the turbine housing inlet (8) and a second aperture (16) in communication with the turbine housing outlet (9), with a gap (20) between the sleeve (14) and turbine housing (2) dimensioned for thermal decoupling of the sleeve (14) and turbine housing (2), and with a sealing ring (21) arranged in the gap (20), and the piston when in the closed position closes the first aperture (15) and the second aperture (16) to block exhaust flow through the sleeve (14), and when in the open position opens the first aperture (15) and the second aperture (16) for exhaust flow through the sleeve (14).

6. The exhaust-gas turbocharger as claimed in claim 5, wherein the gap (20) is formed over the entire length of the sleeve (14) and over the full circumference about the longitudinal axis (L).

\* \* \* \* \*